(12) United States Patent
Kaneko et al.

(10) Patent No.: US 7,655,713 B2
(45) Date of Patent: Feb. 2, 2010

(54) NON-AQUEOUS INK-JET INK AND INK-JET RECORDING METHOD

(75) Inventors: Manabu Kaneko, Hachioji (JP); Makoto Kaga, Hachioji (JP); Masayuki Ushiku, Yokohama (JP); Kenichi Ohkubo, Hachioji (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 0 days.

(21) Appl. No.: 11/809,077

(22) Filed: May 31, 2007

(65) Prior Publication Data

US 2007/0287772 A1 Dec. 13, 2007

(30) Foreign Application Priority Data

Jun. 7, 2006 (JP) ............................. 2006-158299
Sep. 22, 2006 (JP) ............................. 2006-256896

(51) Int. Cl.
*C07F 7/18* (2006.01)
(52) U.S. Cl. .............................. 524/82; 524/84; 524/85; 524/168; 524/173; 524/567
(58) Field of Classification Search ................. 524/567, 524/82, 84, 85, 168, 173
See application file for complete search history.

(56) References Cited

U.S. PATENT DOCUMENTS 5,169,436 A * 12/1992 Matrick ................... 106/31.58
6,156,384 A 12/2000 Hutter et al.
6,541,538 B1 4/2003 Matzinger et al.
2003/0119943 A1 6/2003 Tucker et al.

FOREIGN PATENT DOCUMENTS

| JP | 2002-526631 A | 8/2002 |
| JP | 2005-015672 A | 1/2005 |
| JP | 2005-036199 A | 2/2005 |
| JP | 2005-060716 A | 3/2005 |
| JP | 2006/131811 A | 5/2006 |
| WO | WO 98/04640 A1 | 2/1998 |
| WO | WO 2004-007626 A1 | 1/2004 |

* cited by examiner

*Primary Examiner*—Peter D Mulcahy
(74) *Attorney, Agent, or Firm*—Frishauf, Holtz, Goodman & Chick, P.C.

(57) ABSTRACT

A non-aqueous ink-jet ink containing a pigment, a resin for fixing an image and Compound A represented by Formula (1) or Formula (2), wherein a content of Compound A in the ink-jet ink is from 1.5 to 30 weight % based on the total weight of the ink-jet ink:

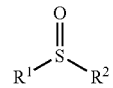

Formula (1)

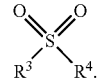

Formula (2)

12 Claims, No Drawings

NON-AQUEOUS INK-JET INK AND INK-JET RECORDING METHOD

This application is based on Japanese Patent Application Nos. 2006-158299 and 2006-256896, each respectively filed on Jun. 7, 2006 and Sep. 22, 2006 in Japan Patent Office, the entire content of which is hereby incorporated by reference.

TECHNICAL FIELD

The present invention relates to a non-aqueous ink-jet ink and an ink-jet recording method.

BACKGROUND

Recently, ink-jet recording system has been applied in various fields of printing works such as photograph imaging, various types of printings, markings and a specific printing such as a color filter because it enable to form an image easily and with low cost.

Ink-jet ink used for the ink-jet recording includes various types of ink such as an aqueous ink containing water as a principal solvent, an oily ink principally containing a non-volatile solvent at room temperature and substantially containing no water, a non-aqueous ink principally containing a solvent volatile at room temperature and substantially containing no water, a hot-melt ink which is solid at room temperature and thermally melted for printing and an active light curable ink capable of curing by active rays such as light, which are selected in accordance with the use.

Besides, a recording medium made from plastics such as poly(vinyl chloride) and polyethylene is used for prints to be posted outdoors which is required to have a weather resistance for a long period and ability of contacting with a curved surface is used, particularly a medium made from soft poly(vinyl chloride) is used in wide field of use. The ink-jet recording method is applied as a method suitable for making small amount and diverse kinds of printing matters since plate making is not necessary and the time for finishing is short in such system, though many methods are applied for printing an image on the Poly(vinyl chloride).

Hitherto, the non-aqueous ink containing cyclohexanone as the principal solvent is used on the occasion of printing on the soft poly(vinyl chloride) recording medium, for example, an ink-jet ink containing cyclohexanone is disclosed, cf. Patent Document 1). Cyclohexanone has high dissolving ability for soft poly(vinyl chloride) so that the pigment contained in the ink is come into soft poly(vinyl chloride). Therefore, high anti-abrasion ability and high glossiness of the printed matter can be obtained. However, cyclohexanone is regulated as the First Class Organic Solvent under Organic Solvent Intoxication Preventing Rules (based on Japanese Occupational Health and Safety Law), and causes a problem of safety and a local gas exhausting device is necessary on the occasion of handling the ink-jet ink containing cyclohexanone.

In contrast to that, non-aqueous ink containing no cyclohexanone is developed and marketed. For example, non-aqueous inks containing a solvent such as N-methylpyrrolidone and amide as the solvent capable of dissolving poly(vinyl chloride) in place of cyclohexanone causing the above problems are disclosed, cf. Patent Documents 2 and 3. Moreover, a non-aqueous ink containing a fixing resin such as a vinyl chloride-vinyl acetate copolymer and an acryl resin for improving the stoutness of the image such as anti-abrasion ability is disclosed, cf. Patent Documents 4 and 5. An ink-jet ink which is inhibited some degree in the odor thereof and has the abrasion resistivity of image formed thereby on poly(vinyl chloride) medium can be obtained by such constitution. However, a problem is newly found that the irregular action of the ink-jet printing head is caused when such ink-jet ink is used for a prolonged period so that normal image formation cannot be performed gradually. Accordingly, any non-aqueous ink-jet ink is not obtained yet, which has no problem of the safeness and odor and sufficient suitability for printing onto poly(vinyl chloride) and can be used for a long period.

Patent Document 1: Japanese translation of PCT international application 2002-526631

Patent Document 2: Japanese published patent application (JP-A) 2005-15672

Patent Document 3: JP-A 2005-60716

Patent Document 4: JP-A 2005-36199

Patent Document 5: WO 2004/007626

SUMMARY

The present invention is attained on the above background. An object of the invention is to provide a non-aqueous ink-jet ink which has printing suitability (anti-abrasion ability and resistivity to wiping with alcohol) for a plastic recording medium such as poly(vinyl chloride) recording medium and is superior in the ejection stability and safeness without problem of odor and does not cause irregularity of the ink-jet head during for a prolonged period so as to be stably used, and an ink-jet recording method using the same ink-jet ink.

The above object of the invention can be attained by the following constitution.

1. A non-aqueous ink-jet ink comprising a pigment, a resin for fixing an image and Compound A represented by Formula (1) or Formula (2):

Formula (1)

wherein $R^1$ and $R^2$ each independently represent a group having 1-6 carbon atoms, provided that $R^1$ and $R^2$ may be jointed to form a ring,

Formula (2)

wherein $R^3$ and $R^4$ each independently represent a group having 1-6 carbon atoms, provided that $R^3$ and $R^4$ may be jointed to form a ring, wherein a content of Compound A in the ink-jet ink is from 1.5 to 30 weight % based on the total weight of the ink-jet ink.

2. The non-aqueous ink-jet ink of the above-described item 1, further comprising Solvent B represented by Formula (3) or Formula (4):

$$R^5—(OX^1)_2—O—R^6 \quad \text{Formula (3)}$$

wherein $R^5$ and $R^6$ each independently represent a methyl group or an ethyl group; and $OX^1$ represents an oxyethylene group or an oxypropylene group,

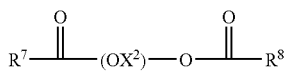

Formula (4)

wherein $R^7$ and $R^8$ each independently represent a methyl group or an ethyl group; and $OX^2$ represents an oxyethylene group or an oxypropylene group.

3. The non-aqueous ink-jet ink of the above-described item 2, wherein a content of Solvent B in the ink-jet ink is from 50 to 90 weight % based on the total weight of the ink-jet ink.

4. The non-aqueous ink-jet ink of the above-described items 2 or 3,
wherein Solvent B is one selected from the group consisting of diethylene glycol diethyl ether, dipropylene glycol dimethyl ether, dipropylene glycol diethyl ether, ethylene glycol diacetate and propylene glycol diacetate.

5. The non-aqueous ink-jet ink of any one of the above-described items 1-4,
wherein the resin for fixing an image is produced by a solution polymerization method.

6. The non-aqueous ink-jet ink of any one of the above-described items 1-5,
wherein the resin for fixing an image is one selected from the group consisting of a vinyl chloride-vinyl acetate copolymer, a vinyl chloride-vinyl acetate-maleic anhydride copolymer, a vinyl chloride-vinyl acetate-vinyl alcohol copolymer and a vinyl chloride-vinyl acetate-hydroxyalkyl acrylate copolymer; and
the resin has a number average molecular weight of from 10,000 to 30,000.

7. A method of forming an image comprising a step of:
jetting droplets of ink-jet ink of any one of the above-described items 1-6 from an ink-jet head on a recording medium comprising a poly(vinyl chloride).

DESCRIPTION OF THE PREFERRED EMBODIMENT

The best embodiment for embodying the invention is described in detail below.

As a result of various investigations by the inventors on the non-aqueous ink-jet ink, it is found that the known non-aqueous ink-jet ink containing N-methylpyrrolidone or amine as the solvent causes a problem such as that the action of the ink-jet printing head is gradually made irregular when such ink is used for a prolonged period a so that image formation cannot be normally performed even though such ink has sufficient suitability for printing on poly(vinyl chloride).

It is supposed that the irregularity of the ink-jet head during the prolonged using period is caused by swelling and dissolving of the parts and adhesive constituting the ink-jet head by the solvent such as N-methylpyrrolidone or amide. Such problem can be inhibited some degree by reducing the content of the solvent in the ink-jet ink. In such case, however, the printing suitability of the ink is made insufficient. It is present situation that any ink-jet ink is not obtained yet, which satisfies both of the printing suitability for the recording medium of plastics such as poly(vinyl chloride) and the long period durability of the ink-jet head.

As a result of investigation by the inventors as to various combination of solvents, it is found that the non-aqueous ink-jet ink which satisfies both of the printing suitability (fast drying ability and anti-abrasion ability) to the recording medium made from plastics such as poly(vinyl chloride) and the stability of the ink-jet head for a long period, and is superior in the ejection stability and safeness without the problem of odor can be realized by a non-aqueous ink-jet ink containing one or more kinds of Compounds A selected from the group consisting of sulfoxide compounds represented by Formula 1 or sulfone compounds represented by Formula 2 in an amount of from 1.5% to 30% by weight, a pigment and a fixing resin.

The constitution of the non-aqueous ink-jet ink of the invention is concretely described below.

The non-aqueous ink-jet ink of the invention, hereinafter referred to as the ink-jet ink or the ink, is characterized in that the ink contains the Compound A constituted by one or more kinds of compound selected from the group consisting of sulfoxide compounds represented by Formula 1 and sulfone compounds represented by Formula 2 in an amount of 1.5% to 30% by weight.

In Formula 1, $R^1$ and $R^2$ are each a substituent having 1 to 6 carbon atoms, for example, a straight or branched chain alkyl group such as a methyl group, an ethyl group, an n-propyl group and an isopropyl group, an alkyl group substituted by a hetero atom such as a hydroxyethyl group, an acetyl group and an acetonyl group, a cyclic group such as a cyclohexyl group and a phenyl group, and an aromatic substituent, and $R^1$ and $R^2$ may be the same or different and may be linked for forming a ring.

In Formula 2, $R^3$ and $R^4$ are each a substituent having 1 to 6 carbon atoms, for example, a straight or branched chain alkyl group such as a methyl group, an ethyl group, an n-propyl group and an isopropyl group, an alkyl group substituted by a hetero atom such as a hydroxyethyl group, an acetyl group and an acetonyl group, a cyclic group such as a cyclohexyl group and a phenyl group, and an aromatic substituent, and $R^3$ and $R^4$ may be the same or different and may be linked for forming a ring.

Examples of the compound represented by Formula 1 or 2 include dimethyl sulfoxide, diethyl sulfoxide, methyl ethyl sulfoxide, diphenyl sulfoxide, tetraethylene sulfoxide, dimethylsulfone, methyl ethyl sulfone, methyl isopropyl sulfone, methyl hydroxyethyl sulfone and sulforane.

The content of Compound A in the ink-jet ink is preferably from 1.5% to 30%, more preferably from 3% to 20%, and still more preferably from 5% to 15% by weight. When the content of Compound A is equal to or more than 1.5% by weight, the solubility of the ink for poly(vinyl chloride) is sufficient to achieve good anti-abrasion ability of an image formed on poly(vinyl chloride) and good resistance of the image for alcohol wiping can be achieved. When the content is equal to or more than 3% by weight, anti-abrasion ability of the image formed on poly(vinyl chloride) and resistance of the image for alcohol wiping become fairly sufficient. When the content is below 30% by weight, irregularity of the ink-jet head after long term use can be prevented and stable ink jetting can be achieved.

The ink-jet ink of the invention may contain a non-aqueous solvent, and it is preferred to contain Solvent B constituted by at least one compound selected from the group consisting of compounds the foregoing Formula 3 or 4.

In Formula 3, $R^5$ and $R^6$ are each a methyl group or an ethyl group and $OX^1$ is an oxyethylene group or an oxypropylene group.

In Formula 4, $R^7$ and $R^8$ are each a methyl group or an ethyl group and $OX^1$ is an oxyethylene group or an oxypropylene group.

Examples of the compounds represented by Formula 3 or 4 of the invention include diethylene glycol dimethyl ether, diethylene glycol diethyl ether, dipropylene glycol dimethyl ether, dipropylene glycol diethyl ether, ethylene glycol diacetate and propylene glycol diacetate.

Among them, diethylene glycol diethyl ether, dipropylene glycol dimethyl ether, dipropylene glycol diethyl ether, ethylene glycol diacetate and propylene glycol diacetate are preferable as the component of Solvent B, by which the fast drying ability of the image printed on poly(vinyl chloride) can be further improved. Particularly preferred Solvent B is one containing diethylene glycol diethyl ether and ethylene glycol diacetate in a ratio of from 1:1 to 10:1.

The content of Solvent B in the ink-jet ink is preferably from 50% to 90% by weight. The fast drying ability of image printed on poly(vinyl chloride) and the ejection stability is improved and the odor of the ink can be reduced by such solvent constitution.

The ink-jet ink of the invention may contain a known solvent other than Compound A and Solvent B within the range in which the object of the invention is not vitiated. Examples of such solvent include an alkylene glycol monoalkyl ether such as diethylene glycol monoethyl ether, triethylene glycol monomethyl ether, dipropylene glycol monomethyl ether and tripropylene glycol monomethyl ether, an alkylene glycol dialkyl ether such as ethylene glycol dibutyl ether and tetraethylene glycol dimethyl ether, and an alkylene glycol monoalkyl ether acetate such as ethylene glycol monobutyl ether acetate.

The resin for fixing an image (or called as a fixing resin) relating to the invention is described bellow.

Various fixing resins (resins for fixing), hereinafter simply referred to as resin, is added to the ink-jet ink of the invention for improving fixing ability when the ink is printed on the recording medium of plastics such as poly(vinyl chloride).

As the resin to be added, an acryl type resin, a polyester type resin, a polyurethane type resin, a vinyl chloride type resin and a vinyl chloride-vinyl acetate copolymer are cited.

Concrete examples of the resin include an acryl type resin such as Johncryl manufactured by Johnson Polymer Co., Ltd., and ESLEC P manufactured by Sekisui Co., Ltd., a polyester type resin such as ELITEL manufactured by Unitica Co., Ltd., and Vylon, manufactured by Toyobo Co., Ltd., and a polyurethane type resin such as Vylon UR manufactured by Toyobo Co., Ltd., NT-HiLamic, manufactured by Dainichi Seika Co., Ltd., Crysvon manufactured by Dainihon Ink Kagaku Kogyo Co., Ltd., and Nipporan manufactured by Nihon Polyurethane Co., Ltd., and a vinyl chloride type resin such as Solbin manufactured by Nisshin Kagaku Kogyo Co., Ltd., Vinibran manufactured by Nisshin kagaku Kogyo Co., Ltd., Salantex manufactured by Asahi Kasei Chemicals Co., Ltd., Sumielite manufactured by Sumitomo Kagaku Co., Ltd., Sekisui PVC manufactured by Sekisui Kagaku Kogyo Co., Ltd., and UCAR manufactured by Daw Chemical Co., Ltd.

The fixing resin functions as a binder for contacting the colorant such as a pigment with the recording medium after printing, and the adhesiveness and the durability are raised accompanied with the increasing in the molecular weight of the fixing resin. Lower molecular weight causes lowering in the viscosity of the ink and energy necessary for ejecting the ink on the occasion of printing is decreased accompanied with lowering of the viscosity so that the load to the ink-jet head is reduced and the ejection tends to be stable. Consequently the fixing after printing is sufficiently performed when the number average molecular weight is not less than 10,000 and the loading for ejecting the ink becomes excessively high when the molecular weight is not more than 30,000. Therefore, the molecular weight within the above range is preferred.

Particularly preferred rein is one having a number average molecular weight of from 10,000 to 30,000 and is comprised of at least one resin selected from a vinyl chloride-vinyl acetate copolymer, a vinyl chloride-vinyl acetate-maleic anhydride copolymer, a vinyl chloride-vinyl acetate-vinyl alcohol copolymer and vinyl chloride-vinyl acetate-hydroxyalkyl acrylate copolymer. The vinyl chloride-vinyl acetate copolymer and a vinyl chloride-vinyl acetate-maleic anhydride copolymer may be mixed for use, and the vinyl chloride-vinyl acetate copolymer or the vinyl chloride-vinyl acetate-maleic anhydride copolymer may be mixed with an acryl type resin, a polyester type resin or a polyurethane type resin.

The ejection stability, anti-abrasion ability and resistivity against alcohol wiping can be improved in suitable balance by adding the fixing resin to the ink of the invention.

The resistivity to wiping with alcohol of the present invention is a resistivity against deformation of the image such as peeling caused by wiping the image surface with ethanol or an ethanol-water mixture. Such wiping is necessary for removing dirt adhered on the image such as an outdoor poster.

For synthesis of the fixing resin relating to the invention, a usual polymerization method such as a suspension polymerization method, an emulsion polymerization method and a solution polymerization method can be applied without any limitation. Among them, the solution polymerization method is preferred.

The solution polymerization method is a method for radical polymerizing monomer having a vinyl group in which the monomer and a polymerization initiator are dissolved in a solvent capable of dissolving the polymer to be formed and polymerized by heating.

The fixing resin synthesized by the solution polymerization method is highly dissolvable even when the molecular weight is relatively high and relatively large amount of the resin can be contained in the ink. Therefore, the anti-abrasion ability can be improved.

The content of the fixing resin in the ink of the invention is preferably from 1 to 10% by weight. The content of not less than 1% by weight improves the weatherproof ability of image printed on poly(vinyl chloride) and that of not more than 10% by weight stabilizes the ink ejection ability. More preferable content range is from 3 to 7% by weight.

The pigment relating to the invention is described below.

The weatherproof ability of the image recorded on the recording medium made from plastics such as poly(vinyl chloride) can be improved by using a pigment as the colorant of the non-aqueous ink-jet ink of the invention.

Any known pigments can be used as the pigment to be used in the invention without any limitation, for example, insoluble pigments, organic pigments such as lake pigments and inorganic pigments such as carbon black are preferably used.

As the insoluble pigment, for example, an azo, an azomethine, a methine, a diphenylmethane, a triphenylmethane, a quinacridone, an anthraquinone, a perylene, an indigo, a quinophthalone, an isoindolinone, an isoindoline, an azine, an oxazine, a thiazine, a dioxazine, a thiazole, a phtlocyanine and diketopyrolopyrrole type pigments are preferred.

As the pigment preferably to be used, for example, the following pigments can be cited.

Examples of a magenta and red pigment include C.I. Pigment Red 2, C.I. Pigment Red 3, C.I. Pigment Red 5, C.I. Pigment Red 6, C.I. Pigment Red 7, C.I. Pigment Red 12, C.I. Pigment Red 15, C.I. Pigment Red 16, C.I. Pigment Red 48

(Ca), C.I. Pigment Red 48 (Mn), C.I. Pigment Red 48:1, C.I. Pigment Red 53:1, C.I. Pigment Red 57 (Ca), C.I. Pigment Red 57:1, C.I. Pigment Red 112, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 168, C.I. Pigment Red 168, C.I. Pigment Red 177, C.I. Pigment Red 178, C.I. Pigment Red 184, C.I. Pigment Red 202, C.I. Pigment Red 209, C.I. Pigment Red 222, C.I. Pigment Red 254 and C.I. Pigment Violet 19.

Examples of an orange or yellow pigment include C.I. Pigment Orange 32, C.I. Pigment Orange 43, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, C.I. Pigment Yellow 213 and C.I. Pigment Yellow 214.

Examples of a green or cyan pigment include C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15;4, C.I. Pigment Blue 16, C.I. Pigment Blue 22, C.I. Pigment Blue 60 and C.I. Pigment Green 7.

When red, green, blue or intermediate color is required other than the above, the following pigments are preferably used singly or in combination, for example, C.I. Pigment Reds 209, 224, 177 and 194;
C.I. Pigment Orange 43;
C.I. Vat Violet 3;
C.I. Pigment Violets 19, 23 and 37;
C.I. Pigment Green 36 and 7, and
C.I. Pigment Blue 15:6.

As a black pigment, for example, C.I. Pigment Black 1, C.I. Pigment Black 6 and C.I. Pigment Black 7 can be cited.

The content of these pigments in the ink of the invention is preferably from 2 to 10% by weight. A light colored ink is sometimes used for reducing the granularity of image. In such case, the content of the pigment is preferably reduced by ⅕ to ½.

The pigments relating to the invention are preferably used after dispersed by a dispersing machine together with a surfactant and an additive necessary for satisfying a designated purpose. As the dispersing machine, known dispersing machines such as a ball mill, a sand mill, an attritor, a roller mill, an agitator, a Henschel mixer, a colloid mill, an ultrasonic homogenizer, a pearl mill, a wet jet mill and a paint shaker are applicable.

The average particle diameter of the pigment dispersion to be used in the ink of the invention is preferably from 10 nm to 200 nm, and more preferably from 50 nm to 150 nm. The aggregation of the particles can be inhibited by making the average particle diameter to not less than 10 nm and the sedimentation of the pigment during storage for a prolonged period can be easily controlled by making the average particle diameter to not more than 200 nm. Therefore, the ink having good storage stability easily can be obtained by making the average particle diameter within the above range.

The particle diameter of the pigment dispersion can be measured by a particle diameter measuring apparatus available on the market utilizing a light scattering method, an electrophoretic method or a laser Doppler method. The average particle diameter also can be measured by using electron microscope. In such case, 100 or more particles are photographed and the resultant images are subjected to statistic treatment by using an image analyzing software such as Image-Pro, manufactured by Mediacybernetics Co., Ltd.

As the pigment dispersing agent, a surfactant and a polymer dispersant are usable and the polymer dispersant is preferred. Examples of the polymer dispersant include a (meth) acryl type resin, a styrene-(meth)acryl type resin, a hydroxyl group-containing carboxylic acid ester, a salt of a long chain polyaminoamide and a high molecular weight acid ester, a salt of high molecular weight polycarboxylic acid, a salt of a long chain polyaminoamide and a polar acid ester, a high molecular weight unsaturated acid ester, a modified polyurethane, a modified polyacrylate, a poly ether ester type anionic surfactant, a naphthalene sulfonic acid formalin condensate salt, an aromatic sulfonate formalin condensate salt, a polyoxyethylene alkylphosphate, polyoxyethylene nonylphenyl ether, stearylamine acetate and a pigment derivative.

Concretely, Johncryl manufactured by Johnson Polymer Co., Ltd., Anti-Terra-U manufactured by BYK Chemie Co., Ltd., Disperbyk manufactured by BYK Chemie Co., Ltd., Efka manufactured by Efka Chemicals Co., Ltd., Flowlen manufactured by Kyoei Kagaku Co., Ltd., Disparon manufactured by Kusumoto Kasei Co., Ltd., Ajisper manufactured by Ajinomoto Finetechno Co., Ltd., Demol, Homogenol and Emulgen each manufactured by Kao Co., Ltd., Solaparse manufactured by Avecia Co., Ltd., and Nikkol manufactured by Nikko Chemical Co., Ltd., are cited.

The dispersant content of the ink-jet ink of the invention is preferably from 10 to 200% by weight. The stability of the pigment dispersion is raised in the range of not less than 10% by weight and the ejection of the ink from the ink-jet head can be easily stabilized by making the content to not more than 200% by weight.

In the ink-jet ink of the invention, various kinds of known additive such as a viscosity controlling agent, a relative resistivity controlling agent, a film forming agent, a UV absorbent, an antioxidant, an anti-color fading agent, an anti-mold agent and a rust preventive may be added additional to the foregoing materials corresponding to the purposes of improving various properties of the ink such as the ejection stability, suitability for the print head or the ink cartridge and the durability of image.

The ink-jet head to be used on the occasion of image formation by ejecting the ink-jet ink of the invention may be either an on-demand type or a continuous type. The ejection system may be any of an electromechanical conversion system such as a single cavity type, a double cavity type, a bender type, a piston type, a share mode type and a shared wall type, and an electro-thermal conversion system such as a thermal ink-jet type and Bubble Jet® type.

In the ink-jet recording method using the ink-jet ink of the invention, an ink-jet recorded image can be obtained by ejecting the ink from the ink-jet head according to digital signals and adhering onto the recording medium using, for example, a printer in which the ink is charged. The image formation while raising the surface temperature of the image recording medium is preferable for fast and surely drying the ink adhering on the recording medium.

The surface temperature is preferably from 40 to 100° C. though the temperature is controlled corresponding to the durability of the recording medium or the drying ability of the ink. Particularly, it is more preferable that the recording is carried out while raising the surface temperature because the wetting ability of the ink with the recording medium surface is improved when poly(vinyl chloride) is used as the recording medium.

The wetting ability and the drying ability of the ink are varied sometimes depending on the kind of the poly(vinyl chloride). Therefore, the surface temperature may be controlled according to the properties of the recording medium.

When the recording is carried out while the surface temperature of the recording medium is raised, a heater is preferably installed in the ink-jet recording apparatus. The surface temperature of the recording medium can be controlled by only the ink-jet recording apparatus by heating the recording medium before or during transportation of the recording medium by the installed heater.

The recording medium to be used in the ink-jet recording method of the invention is preferably one made from poly (vinyl chloride). Concrete examples of the recording medium composed of poly(vinyl chloride) include SOL-371G, SOL-373M and SOL-4701 each manufactured by Bigtechnos Co., Ltd., Glossy Vinyl Chloride manufactured by Systemgraphy Co., Ltd., KSM-VS, KSM-VST and KSM-VT each manufactured by Kimoto Co., Ltd., J-CAL-HGX, J-CAL-YHG and J-CAL-WWWG each manufactured by Kyosho Osaka Co., Ltd., BUS MARK V400 F vinyl and LITECcal V-600 vinyl each manufactured by Flexcon Co., Ltd., FR2 manufactured by Hanwah Co., Ltd., LLBAU13713 and LLSP20133 each manufactured by Sakurai Co., Ltd., P-370B and P-400M each manufactured by Kanbo Pras Co., Ltd., S02P, S13P, S14P, S22P, S24P, S34P and S27P each manufactured by Grafityp Co., Ltd., P-223RW, P-224RW and P-284ZC each manufactured by Lintec Co., Ltd., LKG-19, LPA-70, LPE-248, LPM-45, LTG-11 and LTG-21 each manufactured by Shinseisha Co., Ltd., MP13023 manufactured by Toyo Corporation Co., Ltd., Napoleon Gloss glossy vinyl chloride manufactured by Niki Electronics Co., Ltd., JV-610 and Y-114 each manufactured by IKC Co., Ltd., NIJ-CAPVC and NIJ-SPVCGT each manufactured by Nichie Co., Ltd., 3101/H12/P4, 3104/H12/P4, 3104/H12/P4S, 9800/H12/P4, 3100/H12/R2, 3101/H12/R2, 3104/H12/R2, 1445/H14/P3 and 1438/One Way Vision each manufactured by Inetrocoat Co., Ltd., JT5129PM, JT5128P, JT5822P, JT5829P, JT5829R, JT5829PM, JT5829RM and JT5929PM each manufactured by Mactac Co., Ltd., MPI11005, MPI1900, MPI2000, MPI2001, MPI2002, MPI3000, MPI3021, MPI3500 and MPI3501 each manufactured by Avery Co., Ltd., MA-101G and MA-501G each manufactured by Gin'ich Co., Ltd., FR2 manufactured by Hanfa Japan Co., Ltd., AY-15P, AY-60P, AY-80P, DBSP137GGH and DBSP137GGL each manufactured by Insite Co., Ltd., SJT-V200F and SJT-V400F-1 each manufactured by Hiraoka Shokusen Co., Ltd., SPS-98, SPSM-98, SPSH-98, SVGL-137, SVGS-137, MD3-200, MD3-301M, MD5-100, MD5-101M and MD %-105 each manufactured by Metamark Co., Ltd., 640M, 641G, 641M, 3105M, 3105SG, 3162G, 3164G, 3164M, 3164XG, 3164XM, 3165G, 3165SG, 3165M, 3451SG, 3551G, 3551M, 3631, 3141M, 3651G, 3651M, 3651SG, 3951G and 3641M each manufactured by Orafol Co., Ltd., SVTL-HQ130 manufactured by Lami Corporation Co., Ltd., SP300 GWF and SPE-CLEAD vinyl each manufactured by Catalina Co., Ltd., RM-SJR manufactured by Ryoyo Shoji Co., Ltd., Hi Lucky and New Lucky PVC manufactured by LG Co., Ltd., SIY-110, SIY-310 and SIY-320 each manufactured by Sekisui Co., Ltd., PRINT MI Frontlit and PRINT XL Light weight banner each manufactured by Endutex Co., Ltd., RILET 100, RIJET 145 and RIJET 165 each manufactured by Ritrama Co., Ltd., NM-SG and NM-SM each manufactured by Nichiei Kako Co., Ltd., LTO3SG manufactured by Lukio Co., Ltd., Easy Print 80 and Performance Print 80 each manufactured by Jetgraph Co., Ltd., DSE 550, DSB550, DSE 800G, DSE 802/137, V250WG, V300WG and V350WG each manufactured by Hexis Co., Ltd., and Digital White 6005PE and 6010PE each manufactured by Multifix Co., Ltd.

EXAMPLES

The invention is concretely described referring examples below though the invention is not limited to them. In the invention, "part" and "%" are each "part by weight" and "% by weight", respectively, as long as any specific comment is not attached.

The following pigment dispersants and the fixing resins were each used after removing low boiling point solvent by distillation under reduced pressure and diluting by the organic solvent to be used for dispersion so as to make the solid content to 20% by weight. In the followings, the using amount of the pigment dispersant and the fixing resin are described in terms of solid component amount.

Example 1

<<Preparation of Ink>>

[Preparation of Ink 1]

<Preparation of Pigment Dispersion 1>

Ten parts of C.I. Pigment Blue 15:3, hereinafter referred to as PB 15:3, 5 parts of pigment dispersant Solsperse 24000, manufactured by ICI Japan Co., Ltd., 10 parts of dimethyl sulfoxide (S-1) as Compound A, 60 parts of diethylene glycol diethyl ether and 15 parts of ethylene glycol diacetate as Solvent B were mixed and dispersed by a horizontal type beads mill System Zeta mini, manufactured by Ashizawa Co., Ltd., together with 60% by volume of zirconia beads having a diameter of 0.5 mm. After that the zirconia beads were removed to obtain Pigment Dispersion 1.

<Preparation of Resin Solution 1>

Ten parts of dimethyl sulfoxide as Compound A, 65 parts o ethylene glycol diethyl ether and 15 parts of ethylene glycol diacetate as Solvent B and 10 parts of vinyl chloride-vinyl acetate copolymer synthesized by solution polymerization method having a number average molecular weight of 22,000, VYHD manufactured by Daw Chemicals Co., Ltd, were mixed and dissolved to prepare Resin Solution 1.

<Preparation of Ink>

Fifty parts of Pigment Dispersion 1 was mixed with 50 parts of the above Resin Solution 1 were mixed while stirring and filtered through a filter of 0.8 μm to obtain Ink 1.

[Preparation of Inks 2 to 33]

Inks 2 to 33 were prepared in the same manner as in Ink 1 except that the kind of pigment and fixing resin, the kind and adding amount of Compound A and Solvent B and the kind and the adding amount of another solvent were changed as described in Tables 1 and 2.

TABLE 1

| Ink No. | Pigment Kind | *1 | Dispersant *1 | Fixing resin Kind | *1 | Compound A Kind | *1 | Solvent B Solvent 1 Kind | *1 | Solvent 2 Kind | *1 | Another solvent Solvent 1 Kind | *1 | Solvent 2 Kind | *1 | Remarks |
|---|---|---|---|---|---|---|---|---|---|---|---|---|---|---|---|---|
| 1 | PB15:3 | 5 | 2.5 | PVC | 5 | S-1 | 10 | DEGDEE | 62.5 | EGDAc | 15 | — | — | — | — | Inv. |
| 2 | PB15:3 | 5 | 2.5 | PVC | 5 | S-1 | 3 | DEGDEE | 59.5 | EGDAc | 20 | TEGDME | 5 | — | — | Inv. |
| 3 | PB15:3 | 5 | 2.5 | PVC | 5 | S-1 | 5 | DEGDEE | 67.5 | EGDAc | 15 | — | — | — | — | Inv. |
| 4 | PB15:3 | 5 | 2.5 | PVC | 5 | S-1 | 30 | DEGDEE | 47.5 | EGDAc | 10 | — | — | — | — | Inv. |
| 5 | PB15:3 | 5 | 2.5 | PVC | 5 | S-1 | 5 | DEGDME | 62.5 | EGDAc | 20 | — | — | — | — | Inv. |
| 6 | PB15:3 | 5 | 2.5 | PVC | 5 | S-1 | 5 | DEGDEE | 57.5 | PGDAc | 20 | DPGMEAc | 5 | — | — | Inv. |
| 7 | PB15:3 | 5 | 2.5 | PVC | 5 | S-1 | 15 | DEGDEE | 72.5 | — | — | — | — | — | — | Inv. |
| 8 | PB15:3 | 5 | 2.5 | PVC | 5 | S-1 | 10 | EGDAc | 77.5 | — | — | — | — | — | — | Inv. |
| 9 | PB15:3 | 5 | 2.5 | PVC | 5 | S-1 | 15 | DPGDEE | 62.5 | — | — | TEGDME | 10 | — | — | Inv. |
| 10 | PB15:3 | 5 | 2.5 | PVC | 5 | S-1 | 5 | DEGDEE | 72.5 | — | — | DEGDBE | 10 | — | — | Inv. |
| 11 | PB15:3 | 5 | 2.5 | PVC | 5 | S-1 | 5 | DEGDEE | 67.5 | EGDAc | 10 | EGBEAc | 5 | — | — | Inv. |
| 12 | PB15:3 | 5 | 2.5 | PVC | 5 | S-2 | 10 | DPGDME | 67.5 | EGDAc | 10 | — | — | — | — | Inv. |
| 13 | PB15:3 | 5 | 2.5 | PVC | 5 | S-3 | 5 | DEGDEE | 62.5 | EGDAc | 20 | — | — | — | — | Inv. |
| 14 | PB15:3 | 5 | 2.5 | PVC | 5 | S-4 | 15 | DEGDME | 62.5 | EGDAc | 10 | — | — | — | — | Inv. |
| 15 | PB15:3 | 5 | 2.5 | PVC | 5 | S-5 | 10 | DEGDEE | 57.5 | EGDAc | 20 | — | — | — | — | Inv. |
| 16 | PB15:3 | 5 | 2.5 | PVC | 5 | S-6 | 5 | DEGDEE | 62.5 | EGDAc | 10 | TEGDME | 5 | EGBEAc | 5 | Inv. |
| 17 | PB15:3 | 5 | 2.5 | PVC | 5 | S-7 | 5 | DEGDEE | 62.5 | EGDAc | 20 | — | — | — | — | Inv. |
| 18 | PB15:3 | 5 | 2.5 | PVC | 5 | S-8 | 10 | PGDAc | 57.5 | EGDAc | 20 | — | — | — | — | Inv. |
| 19 | PB15:3 | 5 | 2.5 | PVC | 5 | S-9 | 10 | DEGDME | 72.5 | EGDAc | 5 | — | — | — | — | Inv. |
| 20 | PB15:3 | 5 | 2.5 | PVC | 5 | S-10 | 10 | DEGDEE | 67.5 | EGDAc | 10 | — | — | — | — | Inv. |

*1: Content,
Inv.: Inventive

TABLE 2

| Ink No. | Pigment Kind | *1 | Dispersant *1 | Fixing resin Kind | *1 | Compound A Kind | *1 | Solvent B Solvent 1 Kind | *1 | Solvent 2 Kind | *1 | Another solvent Solvent 1 Kind | *1 | Solvent 2 Kind | *1 | Remarks |
|---|---|---|---|---|---|---|---|---|---|---|---|---|---|---|---|---|
| 21 | PB15:3 | 5 | 2.5 | PVC | 5 | S-1 | 5 | DEGDEE | 17.5 | EGDAc | 10 | TEGDME | 55 | — | — | Inv. |
| 22 | PB15:3 | 5 | 2.5 | PVC | 5 | S-1 | 10 | DEGDME | 77.5 | — | — | — | — | — | — | Inv. |
| 23 | PB15:3 | 5 | 2.5 | PVC | 5 | S-1 | 10 | — | — | — | — | DPGMEAc | 77.5 | — | — | Inv. |
| 24 | PB15:3 | 5 | 2.5 | Acryl | 5 | S-1 | 10 | DEGDEE | 62.5 | EGDAc | 15 | — | — | — | — | Inv. |
| 25 | PY150 | 5 | 2.5 | PVC | 5 | S-1 | 5 | DEGDEE | 62.5 | EGDAc | 20 | — | — | — | — | Inv. |
| 26 | PR122 | 5 | 2.5 | PVC | 5 | S-1 | 10 | DPGDME | 67.5 | EGDAc | 10 | — | — | — | — | Inv. |
| 27 | CB | 5 | 2.5 | PVC | 5 | S-10 | 10 | DEGDEE | 62.5 | EGDAc | 15 | — | — | — | — | Inv. |
| 28 | PB15:3 | 5 | 2.5 | PVC | 5 | S-1 | 1 | DEGDEE | 66.5 | EGDAc | 20 | — | — | — | — | Comp. |
| 29 | PB15:3 | 5 | 2.5 | PVC | 5 | S-1 | 40 | DEGDEE | 37.5 | EGDAc | 10 | — | — | — | — | Comp. |
| 30 | PB15:3 | 5 | 2.5 | PVC | 5 | — | — | DEGDEE | 47.5 | EGDAc | 40 | — | — | — | — | Comp. |
| 31 | PB15:3 | 5 | 2.5 | PVC | 5 | — | — | DEGDEE | 72.5 | — | — | NMP | 15 | — | — | Comp. |
| 32 | PB15:3 | 5 | 2.5 | PVC | 5 | — | — | PGDAc | 67.5 | — | — | NMP | 10 | DPGMEAc | 10 | Comp. |
| 33 | PB15:3 | 5 | 2.5 | PVC | 5 | — | — | — | — | — | — | NMP | 20 | EGBEAc | 67.5 | Comp. |

*1: Content,
Inv.: Inventive,
Comp.: Comparative

Details of the additives described in abbreviations in Tables 1 and 2 are as follows. The numerical value of the content in Tables 1 and 2 are percent by weight.

[Pigment]
PB15:3: C.I. Pigment Blue 15:3
PY150: C.I. Pigment Yellow 150
PR122: C.I. Pigment Red 122
CB: Carbon black

[Fixing Resin]
PVC: Solution polymerized vinyl chloride-vinyl acetate copolymer (Commercial name: VYHD, manufactured by Daw Chemicals Co., Ltd.)
Acryl: Butyl methacrylate-methyl methacrylate copolymer (Commercial name: DEGLAN P24, manufactured by Degussa Co., Ltd.)

[Compound A]
S-1: Dimethyl sulfoxide
S-2: Di-n-propyl sulfoxide
S-3: Di-n-butyl sulfoxide
S-4: Diphenyl sulfoxide
S-5: Tetramethylene sulfoxide
S-6: Dimethylsulfone
S-7: Di-n-propylsulfone
S-8: Methylisopropylsulfone
S-9: Methylhydroxyethylsulfone
S-10: Sulforane

[Solvent B]
DEGDEE: Diethylene glycol diethyl ether
EGDAc: Ethylene glycol diacetate
DEGDME: Diethylene glycol dimethyl ether
PGDAc: Propylene glycol diacetate DPGDEE: Dipropylene glycol diethyl ether
DPGDME: Dipropylene glycol dimethyl ether
[Another Solvent]
TEGDME: Tetraethylene glycol dimethyl ether
DPGMEAC: Dipropylene glycol monomethyl ether acetate
DEGDBE: Diethylene glycol dibutyl ether
EGBEAC: Ethylene glycol monobutyl ether acetate
NMP: N-methylpyrrolidone <<Evaluation of Ink>>

Each of the above prepared inks was evaluated according to the following methods.

[Evaluation of Ejection Suitability]

Flying situation of ink droplets was monitored by a CCD camera under a condition in which the ejection cycle of the ink droplet and that of lighting was synchronized by using a piezo type head having a nozzle diameter of 28 μm, a driving frequency of 15 kHz, a nozzle number of 512, a minimum droplet volume of 14 pl, a nozzle density of 180 dpi (dpi is dot number per 2.54 cm) and a strobe type ink flight observing apparatus described in FIG. 2 of Tokkai 2002-363469. The ejecting situation was evaluated according to the following norms.

A: The ink droplets were normally ejected and any irregularity such as irregularity in the flying direction, lacking of ejection and fluctuation in flying speed was not observed even when the ejection was restarted after an interruption for 3 minutes.

B: The ink droplets were normally ejected and any irregularity was not observed even when the ejection was restarted after an interruption for 1 minute. However, irregular direction and speed fluctuation of the ink droplets were observed at some nozzles when the ejection was restarted after interruption for 3 minutes.

C: The ink droplets were normally ejected but irregular direction and speed fluctuation of the ink droplets were observed at some nozzles when the ejection was restarted after an interruption for 1 minute.

D: Normal ejection of ink droplets was difficulty performed and irregular direction of the droplets was caused at some nozzles and irregularity in the direction and fluctuation in the flying speed and lacking of ejection was caused at many nozzles when the ejection was restarted after an interruption for 1 minute.

[Evaluation of Odor]

Each of the inks 1 to 33 was put into a 500 ml polyethylene bottle and the odor of each of the samples was classified into five ranks by 10 testing persons. The sample judged as almost non-odor was given 1 point and that judged as very unpleasant order was given 5 points, and the order of the sample was evaluated according to the following norms.

A: The average point given by the 10 testers was not less than 4.0.

B: The average point given by the 10 testers was not less tan 3.0 and less than 4.0.

C: The average point given by the 10 testers was not less tan 2.0 and less than 3.0.

D: The average point given by the 10 testers was less than 2.0.

<<Evaluation of Printed Image>>

[Formation of Image]

Each of the inks was charged into an on-demand type ink-jet printer having the maximum recording density of 1440×1440 dpi in which a piezo type head having a nozzle diameter of 28 μm, a driving frequency of 15 kHz, a nozzle number of 512, a minimum droplet volume of 14 pl and a nozzle density of 180 dpi and a heater were installed. The ink was ejected onto a poly(vinyl chloride) recording medium JT5929PM, manufactured by Mactac Co., Ltd., to record a solid image of 10 cm×10 cm. The temperature of the heater was set so that the surface temperature of the recording medium was held at 45° C. by heating from the backside of the recording medium during the printing. The surface temperature of the recording medium was measured by a non-contacting thermometer IT-530N manufactured by Horiba Seisakusho.

[Evaluation of Image]

The images formed by each of Inks 1 to 33 were each evaluated according to the following method. In each of the evaluation items, Rank C or higher was judged as acceptable level.

<Evaluation of Fast Drying Ability>

The solid image recorded on the poly(vinyl chloride) recording medium was rubbed by finger and the fast drying ability of the image was evaluated according to the following norms.

A: The image became not peelable within the time range from just after printing to less than 3 minutes.

B: The image became not peelable within the time range from 3 to less than 4 minutes.

C: The image became not peelable within the time range from 4 to less than 5 minutes.

D: The image became not peelable is 5 minutes or more.

<Evaluation of Anti-abrasion Ability 1>

The anti-abrasion ability 1 of the image was evaluated according the following norms by rubbing the image surface by dry cotton.

A: The image was almost not varied even when the surface was rubbed for 51 or more times.

B: The image density was almost not influenced though damages were slightly formed on the surface of the image after rubbing for 50 times.

C: The image density was lowered during the rubbing for 20 to 49 times.

D: The image density was lowered during the rubbing for 20 times.

<Evaluation of Resistivity to Wiping with Alcohol>

The image formed on the poly(vinyl chloride) was rubbed by cotton cloth impregnated with a mixed solution of ethanol and water in a ratio of 2:1 and resistivity of the image to the rubbing with alcohol was evaluated according to the following norms.

A: The image is almost not varied even when the image was rubbed for 31 or more times.

B: The image density was almost not influenced though damages were slightly formed on the surface of the image after rubbing for 30 times.

C: The image density was lowered between 10 times to 29 times of the rubbing.

D: The image density was lowered by rubbing for less than 10 times.

<Evaluation of Durability of Head for Prolonged Duration>

Thirty three of the ink-jet head were prepared and Inks 1 to 33 were each charged into the heads, respectively and the heats were stood at room temperature in such state. Each of the heads was installed in the recording apparatus every one week during four months and the image was formed under the same condition as above. The image formed after passing four months was evaluated to judge the durability of the head for the prolonged duration. Rank C or higher ranks were judged as acceptable level.

A: The image formed after passing four months was the same as that initially formed and the head was not deteriorated.

B: The image formed after four month was almost the same as that initially formed even though variation in the density was observed at a part of the image and the ink-jet head was almost not deteriorated.

C: White lines were slightly observed on the image formed after passing of four months and the deterioration of the ink-jet head was partially caused.

D: Many white lines were observed on the image formed after passing of four months and the ink-jet head was considerably deteriorated.

Results obtained by the above tests were listed in Table 3.

TABLE 3

| Ink No. | Evaluation Item | | | | | | Remarks |
|---|---|---|---|---|---|---|---|
| | Ejection suitability | Odor | Fast drying ability | Anti-abrasion ability | *1 | *2 | |
| 1 | A | A | A | A | B | A | Inv. |
| 2 | A | B | B | B | C | A | Inv. |
| 3 | A | A | B | B | B | A | Inv. |
| 4 | A | B | A | A | A | C | Inv. |
| 5 | A | A | B | B | B | A | Inv. |
| 6 | A | B | B | B | B | A | Inv. |
| 7 | A | A | A | A | A | B | Inv. |
| 8 | A | B | C | B | B | B | Inv. |
| 9 | A | A | A | A | A | B | Inv. |
| 10 | A | A | B | B | B | A | Inv. |
| 11 | A | A | B | B | B | A | Inv. |
| 12 | A | A | A | A | B | A | Inv. |
| 13 | A | A | B | B | B | A | Inv. |
| 14 | A | A | A | A | A | B | Inv. |
| 15 | A | B | A | A | B | A | Inv. |
| 16 | A | A | B | B | B | A | Inv. |
| 17 | A | A | B | B | B | A | Inv. |
| 18 | A | B | C | B | B | B | Inv. |
| 19 | A | A | A | A | B | A | Inv. |
| 20 | A | A | A | A | B | A | Inv. |
| 21 | A | C | C | B | B | A | Inv. |

TABLE 3-continued

| Ink No. | Evaluation Item | | | | | | Remarks |
|---|---|---|---|---|---|---|---|
| | Ejection suitability | Odor | Fast drying ability | Anti-abrasion ability | *1 | *2 | |
| 22 | A | B | C | C | B | A | Inv. |
| 23 | A | C | C | C | B | A | Inv. |
| 24 | B | A | B | C | C | B | Inv. |
| 25 | A | A | B | B | B | A | Inv. |
| 26 | A | A | A | A | B | A | Inv. |
| 27 | A | A | A | A | B | A | Inv. |
| 28 | C | A | C | C | D | A | Comp. |
| 29 | A | D | A | A | A | D | Comp. |
| 30 | D | B | D | D | D | A | Comp. |
| 31 | C | D | A | B | B | D | Comp. |
| 32 | C | D | B | B | C | C | Comp. |
| 33 | C | D | A | A | A | D | Comp. |

*1: Resistivity to wiping by alcohol
*2: Head durability for long term use
Inv.: Inventive,
Comp.: Comparative As is cleared by the results listed in Table 3, the inks constituted according to the invention is superior to the comparative inks in the ejection suitability and the odor of the ink, the fast drying ability, anti-abrasion ability, resistivity to wiping with alcohol of the image recorded on the poly(vinyl chloride) recording medium and the durability of the ink-jet head for the prolonged duration.

Example 2

<<Preparation of Ink>>

[Preparation of Inks 34 to 59]

Inks 34 to 59 were prepared in the same manner as in Ink 1 in Example 1 except that the kind of the pigment and the fixing resin, the kind and the adding amount of Compound A, the kind and the adding amount of Solvent B and the kind and the adding amount of another solvent were changed as shown in Table 4.

TABLE 4

| Ink No. | Pigment | | Dispersant | Fixing resin | | Compound A | | Solvent B | | | | Another solvent | | Remarks |
|---|---|---|---|---|---|---|---|---|---|---|---|---|---|---|
| | | | | | | | | Solvent 1 | | Solvent 2 | | Solvent 1 | | |
| | Kind | *1 | *1 | Kind | *1 | Kind | *1 | Kind | *1 | Kind | *1 | Kind | *1 | |
| 34 | PB15:3 | 5 | 2.5 | mPVC | 7 | S-10 | 5 | DEGDEE | 65.5 | EGDAc | 15 | — | — | Inv. |
| 35 | PB15:3 | 5 | 2.5 | mPVC | 7 | S-10 | 3 | DEGDEE | 62.5 | EGDAc | 20 | — | — | Inv. |
| 36 | PB15:3 | 5 | 2.5 | mPVC | 7 | S-10 | 10 | DEGDEE | 55.5 | EGDAc | 20 | — | — | Inv. |
| 37 | PB15:3 | 5 | 2.5 | mPVC | 7 | S-10 | 30 | DEGDEE | 55.5 | — | — | — | — | Inv. |
| 38 | PB15:3 | 5 | 2.5 | mPVC | 7 | S-10 | 10 | DEGDME | 60.5 | EGDAc | 15 | — | — | Inv. |
| 39 | PB15:3 | 5 | 2.5 | mPVC | 7 | S-10 | 10 | DEGDEE | 50.5 | PGDAc | 15 | DPGMEAc | 10 | Inv. |
| 40 | PB15:3 | 5 | 2.5 | mPVC | 7 | S-10 | 5 | EGDAc | 80.5 | — | — | — | — | Inv. |
| 41 | PB15:3 | 5 | 2.5 | mPVC | 7 | S-10 | 5 | DPGDEE | 65.5 | — | — | TEGDME | 15 | Inv. |
| 42 | PB15:3 | 5 | 2.5 | mPVC | 7 | S-10 | 5 | DEGDEE | 70.5 | — | — | DEGDBE | 10 | Inv. |
| 43 | PB15:3 | 5 | 2.5 | mPVC | 7 | S-10 | 5 | DPGDME | 70.5 | EGDAc | 10 | — | — | Inv. |
| 44 | PB15:3 | 5 | 2.5 | mPVC | 7 | S-10 | 5 | PGDAc | 57.5 | EGDAc | 20 | — | — | Inv. |
| 45 | PB15:3 | 5 | 2.5 | mPVC | 7 | S-10 | 5 | DEGDEE | 67.5 | EGDAc | 15 | — | — | Inv. |
| 46 | PB15:3 | 5 | 2.5 | mPVC | 7 | S-10 | 5 | DEGDEE | 65.5 | EGDAc | 15 | — | — | Inv. |
| 47 | PB15:3 | 5 | 2.5 | mPVC | 5 | S-10 | 5 | DEGDEE | 67.5 | EGDAc | 15 | — | — | Inv. |
| 48 | PY150 | 5 | 2.5 | mPVC | 7 | S-10 | 5 | DEGDEE | 65.5 | EGDAc | 15 | — | — | Inv. |
| 49 | PR122 | 5 | 2.5 | mPVC | 7 | S-10 | 5 | DEGDEE | 65.5 | EGDAc | 15 | — | — | Inv. |
| 50 | PB15:3 | 5 | 2.5 | sPVC | 7 | S-10 | 5 | DEGDEE | 65.5 | EGDAc | 15 | — | — | Inv. |
| 51 | PB15:3 | 5 | 2.5 | sPVC | 5 | S-10 | 5 | DEGDEE | 65.5 | EGDAc | 15 | — | — | Inv. |
| 52 | PB15:3 | 5 | 2.5 | mPVC | 7 | S-1 | 5 | DEGDEE | 65.5 | EGDAc | 15 | — | — | Inv. |
| 53 | PB15:3 | 5 | 2.5 | mPVC | 5 | S-1 | 5 | DEGDEE | 65.5 | EGDAc | 15 | — | — | Inv. |
| 54 | PB15:3 | 5 | 2.5 | sPVC | 7 | S-1 | 5 | DEGDEE | 65.5 | EGDAc | 15 | — | — | Inv. |
| 55 | PB15:3 | 5 | 2.5 | sPVC | 5 | S-1 | 5 | DEGDEE | 67.5 | EGDAc | 15 | — | — | Inv. |

TABLE 4-continued

| Ink No. | Pigment Kind | *1 | Dis-persant *1 | Fixing resin Kind | *1 | Com-pound A Kind | *1 | Solvent B Solvent 1 Kind | *1 | Solvent 2 Kind | *1 | Another solvent Solvent 1 Kind | *1 | Re-marks |
|---|---|---|---|---|---|---|---|---|---|---|---|---|---|---|
| 56 | PB15:3 | 5 | 2.5 | mPVC | 7 | S-10 | 1 | DEGDEE | 64.5 | EGDAc | 20 | — | — | Comp. |
| 57 | PB15:3 | 5 | 2.5 | mPVC | 7 | S-10 | 40 | DEGDEE | 35.5 | EGDAc | 10 | — | — | Comp. |
| 58 | PB15:3 | 5 | 2.5 | mPVC | 5 | S-10 | 1.5 | DEGDEE | 66 | EGDAc | 20 | — | — | Inv. |
| 59 | PB15:3 | 5 | 2.5 | mPVC | 5 | S-10 | 2 | DEGDEE | 70.5 | EGDAc | 15 | — | — | Inv. |

*1: Content,
Inv.: Inventive,
Comp.: Comparative

Details of the additives described in abbreviations in Table 4 are as follows. The numerical values of the content in Table 4 are percent by weight.

[Fixing Resin]

mPVC: Solution polymerized vinyl chloride-vinyl acetate-maleic anhydride copolymer (Commercial name: VMCC, manufactured by Daw Chemicals Co., Ltd.)

PVC: Suspension polymerized vinyl chloride-vinyl acetate copolymer (Commercial name: Solbin Toa, manufactured by Nisshin Kagaku Co., Ltd.)

The details of the other additives each described in the abbreviations are the same as in Example 1.

<<Evaluation of Ink>>

The above prepared inks were each evaluated as to the ejection suitability and the odor in the same manner as in Example 1.

[Evaluation of Image]

Images were formed by each of Inks 34 to 59 in the same manner as in Example 1 and the fast drying ability, the resistivity to wiping with alcohol and the durability of head for the prolonged duration of each of the images were evaluated in the same manner as in Example 1. Furthermore, anti-abrasion ability 2 was evaluated by the following manner. Rank C or higher was judged as the acceptable level.

<Evaluation of Anti-abrasion Ability 2>

The surface of the image recorded on the poly(vinyl chloride) was rubbed by dry cotton and the anti-abrasion ability 2 was evaluated according to the following norms. The evaluation condition of the anti-abrasion ability 2 is severer than that of the anti-abrasion ability in Example 1 since the number of times of the rubbing in the evaluation of the anti-abrasion ability 2 were larger that then that in Example 1.

A: The image was almost not varied even when the surface was rubbed for 81 or more times.

B: The image density was almost not influenced though damages were slightly formed on the surface of the image after rubbing for 80 times.

C: The image density was lowered during the rubbing for 40 to 79 times.

D: The image density was lowered during the rubbing for 40 times.

Thus obtained results are shown in Table 5.

TABLE 5

| Ink No. | Ejection suitability | Odor | Fast drying ability | Anti-abrasion ability 2 | *1 | *2 | Remarks |
|---|---|---|---|---|---|---|---|
| 34 | A | A | A | A | A | A | Inv. |
| 35 | A | A | B | C | B | A | Inv. |
| 36 | A | A | B | A | A | A | Inv. |
| 37 | A | B | A | A | A | C | Inv. |
| 38 | A | A | A | A | B | A | Inv. |
| 39 | A | B | B | A | B | A | Inv. |
| 40 | A | B | C | A | B | B | Inv. |
| 41 | A | A | A | A | A | B | Inv. |
| 42 | A | A | B | A | A | A | Inv. |
| 43 | A | A | A | B | B | A | Inv. |
| 44 | A | B | C | A | A | B | Inv. |
| 45 | A | A | A | B | B | A | Inv. |
| 46 | A | A | B | A | A | A | Inv. |
| 47 | A | A | A | B | B | A | Inv. |
| 48 | A | A | A | A | A | A | Inv. |
| 49 | A | A | A | A | A | A | Inv. |
| 50 | C | A | B | A | A | A | Inv. |
| 51 | B | A | A | C | B | A | Inv. |
| 52 | A | A | A | A | A | A | Inv. |
| 53 | A | A | A | C | B | A | Inv. |
| 54 | C | A | B | A | A | A | Inv. |
| 55 | B | A | A | C | B | A | Inv. |
| 56 | D | A | C | D | D | A | Comp. |
| 57 | B | C | D | A | A | D | Comp. |
| 58 | B | A | C | C | C | A | Inv. |
| 59 | A | A | B | C | C | A | Inv. |

*1: Resistivity to wiping by alcohol
*2: Head durability for long term use
Inv.: Inventive,
Comp.: Comparative As is cleared by the results listed in Table 5, the inks constituted according to the invention is superior to the comparative inks in the ejection suitability and the odor of the ink, the fast drying ability, anti-abrasion ability, resistivity to wiping with alcohol of the image recorded on the poly(vinyl chloride) recording medium and the durability of the ink-jet head for the prolonged duration. Moreover, it is under stood that much resin can be contained in the ink without any influence on the ejection suitability and the anti-abrasion ability of the ink can be further improved by the use of the fixing resin synthesized by the solution polymerization method.

What is claimed is:

1. A non-aqueous ink-jet ink for printing on a recording medium comprising a poly(vinyl chloride), the ink-jet ink comprising a pigment, a resin for fixing an image, a compound A represented by Formula (1) or Formula (2) and a solvent B represented by Formula (3) or Formula (4):

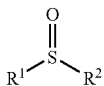

Formula (1)

wherein $R^1$ and $R^2$ each independently represent a group having 1-6 carbon atoms, provided that $R^1$ and $R^2$ may be joined to form a ring,

Formula (2)

wherein $R^3$ and $R^4$ each independently represent a group having 1-6 carbon atoms, provided that $R^3$ and $R^4$ may be joined to form a ring, wherein a content of the compound A in the ink-jet ink is from 1.5 to 30 weight % based on the total weight of the ink-jet ink,

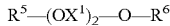

Formula (3)

wherein $R^5$ and $R^6$ each independently represent a methyl group or an ethyl group; and $OX^1$ represents an oxyethylene group or an oxypropylene group,

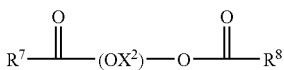

Formula (4)

wherein $R^7$ and $R^8$ each independently represent a methyl group or an ethyl group; and $OX^2$ represents an oxyethylene group or an oxypropylene group,
wherein a content of the solvent B in the ink-jet ink is from 50 to 90 weight % based on the total weight of the ink-jet ink;
the resin for fixing an image is one selected from the group consisting of a vinyl chloride-vinyl acetate copolymer, a vinyl chloride-vinyl acetate-maleic anhydride copolymer, a vinyl chloride-vinyl acetate-vinyl alcohol copolymer and a vinyl chloride-vinyl acetate-hydroxyalkyl acrylate copolymer; and
the resin for fixing an image has a number average molecular weight of from 10,000 to 30,000.

2. The non-aqueous ink-jet ink of claim 1,
wherein the solvent B is at least one selected from the group consisting of diethylene glycol diethyl ether, dipropylene glycol dimethyl ether, dipropylene glycol diethyl ether, ethylene glycol diacetate and propylene glycol diacetate.

3. The non-aqueous ink-jet ink of claim 1,
wherein the resin for fixing an image is produced by a solution polymerization method.

4. A method of forming an image comprising a step of:
jetting droplets of the ink-jet ink of claim 1 from an ink-jet head on the recording medium comprising a poly(vinyl chloride).

5. The method of claim 4,
wherein the solvent B is at least one selected from the group consisting of diethylene glycol diethyl ether, dipropylene glycol dimethyl ether, dipropylene glycol diethyl ether, ethylene glycol diacetate and propylene glycol diacetate.

6. The method of claim 4, further comprising
controlling a surface temperature of the recording media of 40 to 100° C.

7. The non-aqueous ink-jet ink of claim 1,
wherein a content of the compound A in the ink-jet ink is from 5 to 15 weight % based on the total weight of the ink-jet ink.

8. The non-aqueous ink-jet ink of claim 1,
wherein an amount of the resin for fixing an image is from 1 to 10% by weight based on the total weight of the ink-jet ink.

9. The non-aqueous ink-jet ink of claim 3,
wherein the resin for fixing an image is one selected from the group consisting of a vinyl chloride-vinyl acetate copolymer, a vinyl chloride-vinyl acetate-maleic anhydride copolymer, a vinyl chloride-vinyl acetate-vinyl alcohol copolymer and a vinyl chloride-vinyl acetate-hydroxyalkyl acrylate copolymer;
the resin has a number average molecular weight of from 10,000 to 30,000; and
an amount of the resin for fixing an image is from 1 to 10% by weight based on the total weight of the ink-jet ink.

10. The method of claim 4,
wherein a content of the compound A in the ink-jet ink is from 5 to 15 weight % based on the total weight of the ink-jet ink.

11. The method of claim 4,
wherein an amount of the resin for fixing an image is from 1 to 10% by weight based on the total weight of the ink-jet ink.

12. The method of claim 5, wherein
an amount of the resin for fixing an image is from 1 to 10% by weight based on the total weight of the ink-jet ink.

* * * * *